US011798587B1

(12) United States Patent
Guo et al.

(10) Patent No.: US 11,798,587 B1
(45) Date of Patent: Oct. 24, 2023

(54) REDUCING NOISE IN BACK EMF SENSING FOR DATA STORAGE

(71) Applicant: Western Digital Technologies, Inc., San Jose, CA (US)

(72) Inventors: Guoxiao Guo, Irvine, CA (US); Jianbin Nie, Fremont, CA (US); Triet Tieu, Milipitas, CA (US); Duc H. Banh, San Jose, CA (US); Tianyu Jiang, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/693,626

(22) Filed: Mar. 14, 2022

(51) Int. Cl.
*G11B 5/55* (2006.01)

(52) U.S. Cl.
CPC .......... *G11B 5/5543* (2013.01); *G11B 5/5565* (2013.01); *G11B 5/5573* (2013.01)

(58) Field of Classification Search
None
See application file for complete search history.

(56) References Cited

U.S. PATENT DOCUMENTS

| | | | |
|---|---|---|---|
| 5,394,102 A * | 2/1995 | Mori | G01P 3/44 |
| 5,654,840 A | 8/1997 | Patton | |
| 5,768,045 A * | 6/1998 | Patton, III | G11B 21/12 |
| 5,781,363 A | 7/1998 | Rowan et al. | |
| 6,826,007 B1 | 11/2004 | Patton, III | |
| 6,954,324 B1 | 10/2005 | Tu et al. | |
| 7,141,949 B2 | 11/2006 | Harwood | |
| 7,795,828 B2 | 9/2010 | Proctor et al. | |
| 8,294,400 B2 | 10/2012 | Harmer | |
| 8,941,939 B1 | 1/2015 | Rigney et al. | |
| 9,355,666 B1 * | 5/2016 | Huang | G11B 5/59627 |
| 9,502,060 B2 | 11/2016 | Koyama et al. | |
| 9,972,348 B1 | 5/2018 | Ferris et al. | |
| 10,054,622 B2 | 8/2018 | Hernandez et al. | |
| 10,242,698 B1 | 3/2019 | Byoun et al. | |
| 2008/0007271 A1 | 1/2008 | Smith et al. | |
| 2010/0201295 A1 * | 8/2010 | Kuwamura | H02P 6/182 |
| | | | 318/400.04 |
| 2019/0348935 A1 * | 11/2019 | Kurosawa | H02P 6/182 |

OTHER PUBLICATIONS

Moon et al., "A Study on the Enhanced Filtering for the Removal of BEMF in BLDC Motors", Journal of IKEEE, vol. 23, No. 1, pp. 310-313, Mar. 2019.
Soni et al., "FPGA Based Speed Control and Back EMF Extraction from Line Voltages Using IIR Digital Filters for BLDCM", Advances in Power and Control Engineering, pp. 41-62, 2020.
Vinida et al., "Sensorless Control of Brushless DC motors and H ∞ Control Theory Applications—A Literature Review", IOSR Journal of Electrical and Electronics Engineering, vol. 11, No. 1, Version IV, pp. 19-25, 2016.

* cited by examiner

*Primary Examiner* — Peter Vincent Agustin
(74) *Attorney, Agent, or Firm* — Neugeboren O'Dowd PC

(57) ABSTRACT

Various illustrative aspects are directed to a data storage device comprising: a voice coil motor (VCM) and one or more processing devices, configured to actuate the VCM, switch on measuring a back electromotive force (BEMF) from the VCM for intervals of an initial BEMF measurement that are free of spikes in the initial BEMF measurement, and process a measured BEMF signal from the intervals of the initial BEMF measurement that are free of spikes in a change of current term of the initial BEMF measurement.

23 Claims, 12 Drawing Sheets

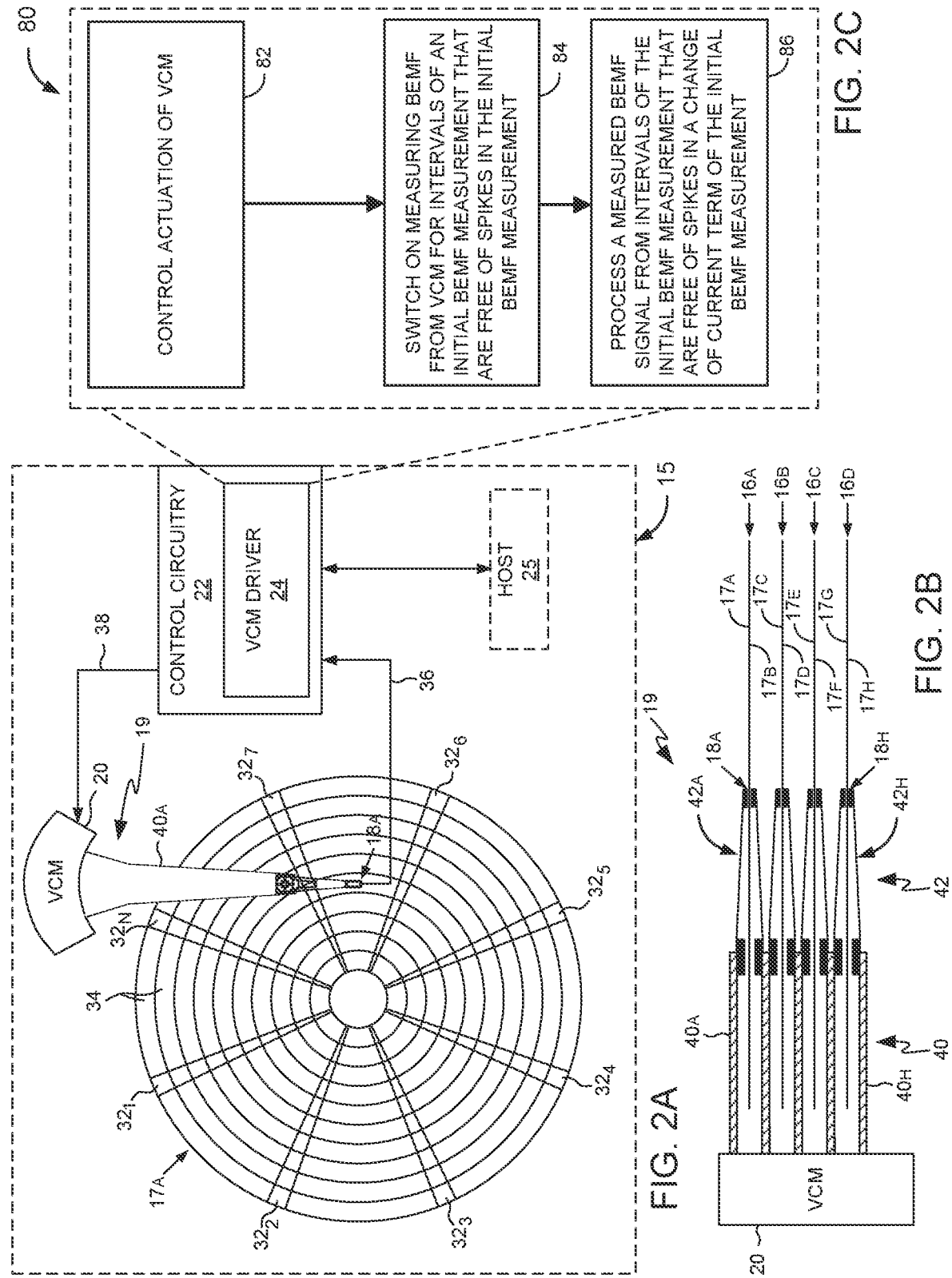

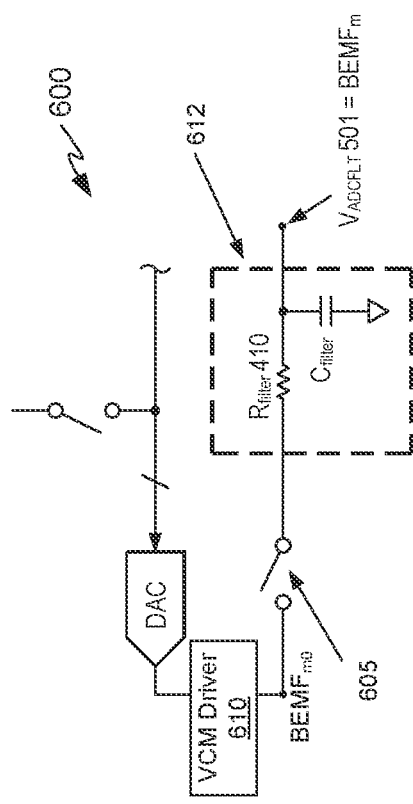
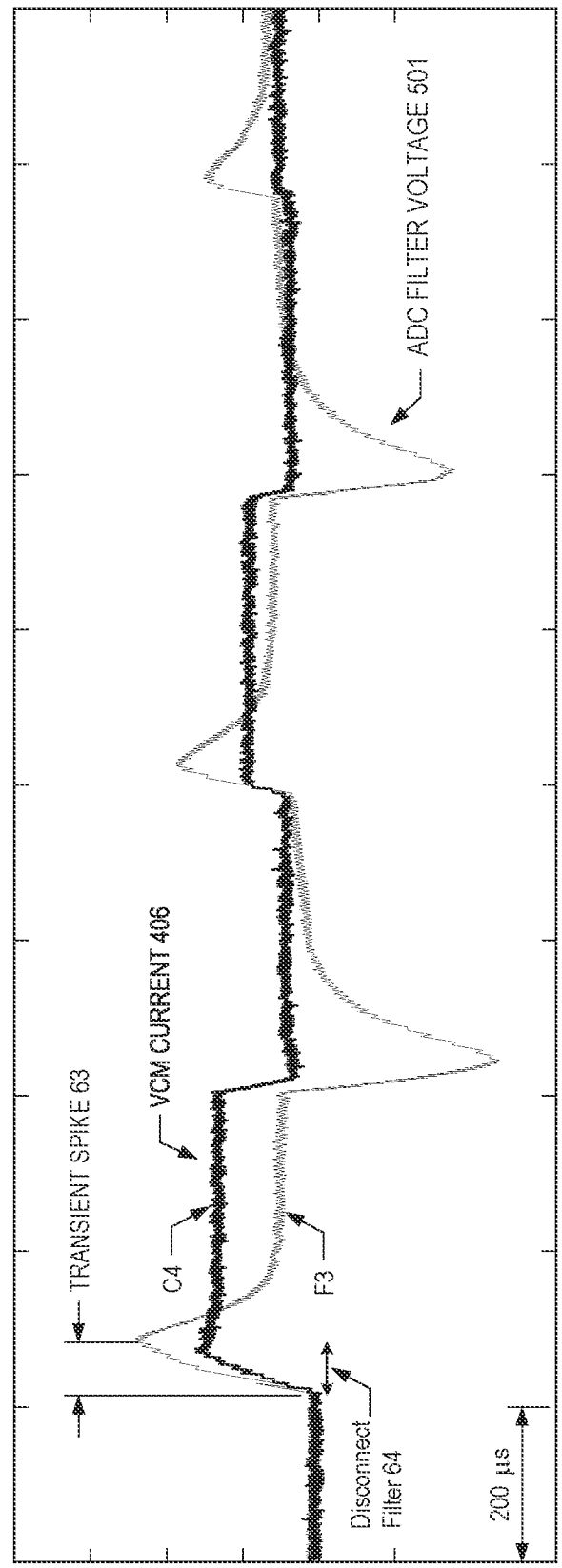
FIG. 6A
FIG. 6B

US 11,798,587 B1

REDUCING NOISE IN BACK EMF SENSING FOR DATA STORAGE

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some examples, Back Electromotive Force (BEMF) measurements of a Voice Coil Motor (VCM) may be utilized to estimate the velocity of an actuator head, for instance, during Open Loop Boot (OLB) spiral, or when the actuator head is on a ramp. As used herein, the term "OLB spiral" may refer to an initial phase for a disk drive when the first spiral is being written on a blank disk. In some cases, a filter may be employed at the output of a BEMF extraction circuit to reduce the amount of noise entering a circuit used to measure the BEMF. In some circumstances, however, this filter introduces extra noise in the form of transient spikes, adversely impacting the accuracy of the BEMF measurement (hereafter $BEMF_m$). These transient spikes are caused by a rapid change of current term (e.g., a rate of change of current term exceeding a threshold) of the VCM and the inductance of the VCM driven by a power amplifier employing a high bandwidth current feedback. Various aspects disclosed herein are directed to enhancing the accuracy of the BEMF measurement ($BEMF_m$) for data storage devices, such as hard disk drives, among other aspects. In some embodiments, the self-induced noise (i.e., transient spikes) introduced by the filter may be removed using one or more switches at the input of the low pass filter. These switches may be implemented in an analog or a digital manner. Further, these switches may help remove, or at least reduce, the effects of the transient spikes on the BEMF measurement ($BEMF_m$) by preventing the transient spikes from entering the low pass filter. In this way, the $BEMF_m$ accuracy and speed is enhanced by reducing the wait time required for the transient spikes to settle, which serves to optimize OLB acceleration and Load Unload (LUL) phases for disk drives, to name two non-limiting examples.

Various illustrative aspects are directed to a data storage device comprising a voice coil motor (VCM) and one or more processing devices configured to actuate the VCM, switch on measuring a BEMF from the VCM for intervals of an initial BEMF measurement that are free of spikes in the initial BEMF measurement and process a measured BEMF signal from the intervals of the initial BEMF measurement that are free of spikes in a change of current term of the initial BEMF measurement.

Various illustrative aspects are directed to a method of operating a data storage device, comprising actuating by one or more processing devices, a VCM, switching on, by the one or more processing devices, measurement of a BEMF from the VCM for intervals of an initial BEMF measurement that are free of spikes in the initial BEMF measurement, and processing, by the one or more processing devices, a measured BEMF signal from the intervals of the initial BEMF measurement that are free of spikes in a change of current term of the initial BEMF measurement.

Various illustrative aspects are directed to one or more processing devices, comprising means for actuating a VCM, means for switching on measuring a BEMF from the VCM for intervals of an initial BEMF measurement that are free of spikes in the initial BEMF measurement, and means for processing a measured BEMF signal from the intervals of the initial BEMF measurement that are free of spikes in a change of current term of the initial BEMF measurement.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, in accordance with aspects of the present disclosure.

FIG. 2C illustrates a method that a data storage device may perform, execute, and implement, in accordance with aspects of the present disclosure.

FIG. 6A illustrates a schematic diagram of a switch coupled between a VCM driver circuit and an Analog to Digital (ADC) filter, in accordance with aspects of the present disclosure.

FIG. 6B illustrates a conceptual graph of voltage and current measurements, including transient spikes, during an OLB phase of a data storage device, in accordance with aspects of the present disclosure.

DETAILED DESCRIPTION

Figure 1:
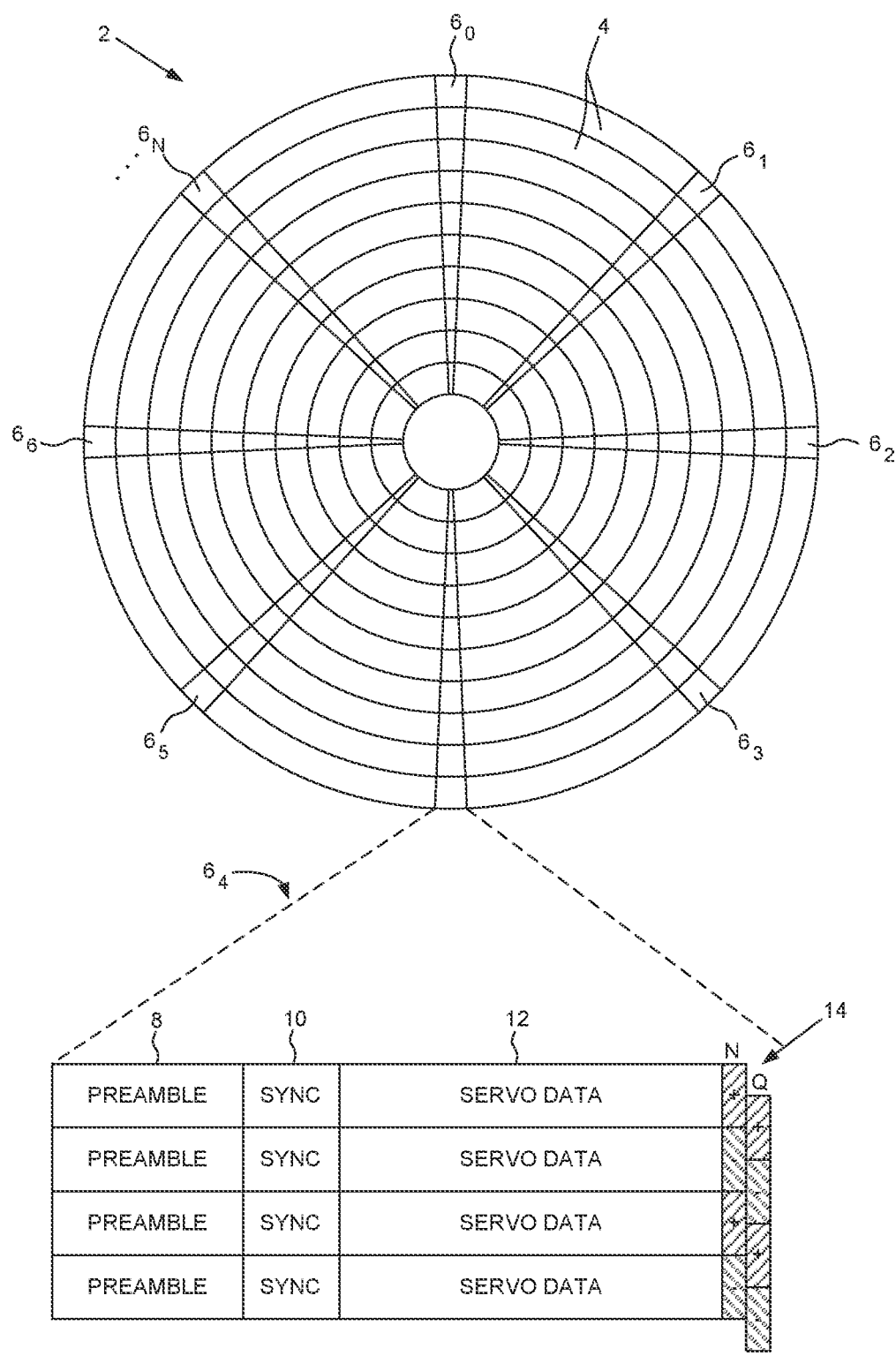
FIG. 1 shows a prior art disk format as comprising a number of radially-spaced, concentric servo tracks defined by servo wedges recorded around the circumference of each servo track.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

As previously described, in hard disk drives or HDDs, the BEMF measurement (herein referred to as $BEMF_m$) may be used as a way to measure the velocity of an actuator arm (e.g., actuator arm 40 in FIG. 2A). In some instances, it is important to be able to accurately control the velocity of the actuator arm 40 without having to access the positioning information of the read/write head (e.g., head 18), which is attached to the actuator arm. For Self-Servo-Writing applications, accurate velocity control translates to accurate positioning of the read/write head during repeated motions across the disk surface. Accurate velocity control also prevents mechanical stresses from occurring on the head and improves acoustics and reliability, for example, in ramp load-unload (LUL) operations. In another example, when a servo system loses sync to the servo pattern, it may load the head to a known location, such as the ramp or the inner diameter crash stop (IDCS), for error recovery. In some aspects, a more accurate BEMF measurement ($BEMF_m$) may help enhance reliability of such operations undertaken for error recovery.

In some cases, a BEMF voltage drop is created across the VCM coil, for instance, when the coil is moving in a magnetic field. The voltage across the VCM coil is a function of the BEMF and the impedance of the coil (i.e., both resistive and inductive effects) in response to a VCM current. Specifically, the voltage developed across the VCM coil may include three components, such as a resistive component (e.g., a product of the current, $I_{VCM}$, provided to the VCM coil by the driver and the VCM coil's intrinsic resistance, $R_{VCM}$), an inductance component ($L_{VCM}*di/dt$), and the BEMF. In some cases, the inductance component may be a transient voltage produced by the VCM coil's intrinsic inductance. For instance, changes to the VCM current may contribute to voltage drops across the VCM that are not due to the induced BEMF. To differentiate between the various BEMF terms, the following terminology is used herein and elsewhere throughout the disclosure. Specifically, the terms "actual BEMF", "BEMF", or "true BEMF" may be used to refer to the actual BEMF voltage drop created across the VCM coil; the terms "measured BEMF", "ADC filter voltage", or "$BEMF_m$," refers to the voltage measured at or near the output of the low pass filter (e.g., filter 435 in FIG. 4), while the "initial BEMF measurement" or "$BEMF_{m0}$" refers to the voltage measured at or near the input of the low pass filter. In some cases, the true/actual BEMF, which is proportional to the VCM velocity, may not have any spikes, because the VCM velocity is based on the integration of an acceleration, and it takes some time to change the velocity. However, the initial BEMF measurement ($BEMF_{m0}$) may include spikes because of the noise in the di/dt estimation. In some cases, this noise may be filtered and the measured BEMF (i.e., $BEMF_m$) may include spikes due to the absence of the di/dt term and/or an inaccurate estimation of the spiky di/dt term. In accordance with aspects of the present disclosure, a control circuitry (e.g., control circuitry 22 in FIG. 2A) is configured to output an estimated BEMF measurement (hereafter represented as $BEMF_m$) by ignoring transient spikes in the initial BEMF measurement (hereafter represented as $BEMF_{m0}$), where the transient spikes are a by-product of a change (e.g., a rapid change, where the rate of change exceeds a pre-defined threshold and/or when the di/dt term is too noisy) in the VCM current.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

FIG. 2A also depicts servo sectors 32 (e.g., servo sectors $32_1$ through $32_N$) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. In the example of FIG. 2A, the control circuitry 22 and/or the VCM driver 24 processes read signals 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate a VCM control signal 38 applied to the VCM 20 which rotates the actuator arm 40 about a pivot in order to actuate the head 18 radially over the disk 16 in a direction that reduces the PES. In some examples, the disk drive may also comprise a suitable microactuator, such as a suitable piezo-electric (PZT) element for actuating the head 18 relative to a suspension, or for actuating a suspension relative to the actuator arm 40.

As noted above, the BEMF voltage drop is proportional to VCM velocity. Typically, the true or actual BEMF voltage drop does not spike since the velocity does not spike. For instance, the velocity, which is the integration of acceleration, may not spike as it takes some time to change the velocity. In some circumstances, however, the BEMF measurement ($BEMF_m$) signal may contain spikes because of the way it is extracted (e.g., due to an inaccurate di/dt term or the absence of the di/dt term). Aspects of the present disclosure are directed to enhancing the accuracy of the BEMF measurement ($BEMF_m$) by reducing the effects of the transient spikes on the BEMF measurement. In some examples (82), the control circuitry 22 is configured to control the actuation of the primary actuator (i.e., VCM). Further, the VCM 20 is configured to actuate the head 18 over the disk surfaces 17. The control circuitry 22 is also configured to switch on measuring BEMF ($BEMF_m$) from the VCM 20 for intervals of the initial BEMF measurement, i.e., $BEMF_{m0}$, that are free of spikes in the initial BEMF measurement (84) and process a measured BEMF signal from intervals of the initial BEMF measurement ($BEMF_{m0}$) that are free of spikes in a change of current term of the initial BEMF measurement (86). In some cases, a spike comprises rapid changes in the initial BEMF measurement ($BEMF_{m0}$) over time. As an example, a spike in the $BEMF_{m0}$ may be defined when a rate of change in the $BEMF_{m0}$ exceeds a threshold. While not necessary, the threshold may be pre-defined (e.g., above 2 V in <0.01 ms, above 4 V in <0.01 ms, less than −2 V in <0.01 ms, to name a few non-limiting examples). In another cases, a spike in the $BEMF_{m0}$ comprises rapid changes in the $BEMF_{m0}$ over time, where the rate of change is relative to a set of bounds on a rate of change for a majority of the $BEMF_{m0}$ signal. In some cases, if the rate of change for a majority of the $BEMF_{m0}$ signal is between an upper bound 'X' and a lower bound 'Y', a spike in the $BEMF_{m0}$ may be defined when a rate of change in the $BEMF_{m0}$ is above or below an upper/lower threshold, where the upper and lower thresholds are relative to the upper and lower bounds. Said another way, spikes in the $BEMF_{m0}$ may be defined by intervals of the $BEMF_{m0}$ that comprise anomalous rates of change relative to the majority of the $BEMF_{m0}$ signal.

As noted above, the VCM 20 generates a BEMF, where the BEMF is proportional to the velocity of the VCM 20. Accurate measurement of the BEMF facilitates in more accurate control of the VCM 20, which is especially important when there is no servo sector information available (e.g., during OLB phase, when the first spiral is written on the disk; outside servo information area, such as during load-unload or LUL operations), and when detecting the rotational speed of the VCM 20 is the only source of positional information. Since the VCM is associated with an inductance (L), a transient spike in the form of a product of the inductance and a rate of change of current term, such as, but not limited to, the $L_m$ di/dt transient spike, is introduced. In some examples, ensuring that this transient spike is bypassed or prevented from entering the low pass filter, in accordance with aspects of this disclosure (e.g., shown as BEMF extraction circuit 440 in FIG. 4) may enable a more accurate BEMF estimation than is possible in the prior art. Aspects of this disclosure are directed to estimating BEMF (i.e., measured $BEMF_m$) from the VCM for intervals of the initial BEMF measurement ($BEMF_{m0}$) that are free of these noisy transient spikes. In some embodiments, these transient spikes may be removed from entering the low pass filter (e.g., filter 435 in FIG. 4) via one or more switches (e.g., switch 405) coupled at or near the input of said low pass filter. In some examples, a switch 405 may be coupled to a resistor ($R_{filter}$ 410) of the low pass filter. Further, the switch 405 may be opened, for instance, at each VCM DAC update, which allows the transient spike to settle. Once the transient spike has settled (or substantially settled, e.g., below 95% of its peak magnitude), the switch may be closed and connected to the input of the low pass filter, following which the $BEMF_m$ signal may be processed. In this regard, the measurement of a back electromotive force (BEMF) from the VCM for intervals of an initial BEMF measurement in the initial BEMF measurement may be based on a measurement of such spikes. As such this serves to reduce spikes in the initial BEMF measurement.

It should be noted that, as used herein, the term "transient spike" may refer to the di/dt transient spike, or alternatively, the $L_m$*di/dt transient spike. Other types of transient spikes associated with the VCM, or other components of the disk drive (e.g., the spindle motor), are contemplated in different embodiments, and the examples listed herein are not intended to be limiting.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the $BEMF_m$ voltage generated by the VCM 20 during a calibration seek (where the $BEMF_m$ voltage represents an estimated velocity of the VCM). The bootstrap spiral track is then written to the disk using the feed-forward compensation. Alternatively, the measured $BEMF_m$ can be used for velocity feedback control when writing the OLBs.

Figure 3A:
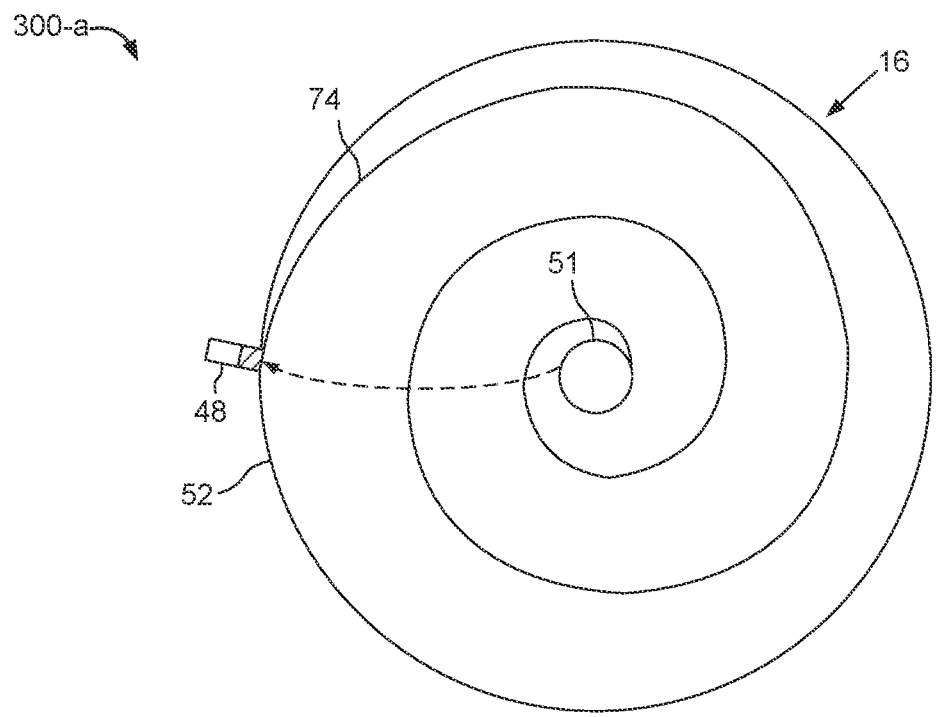
FIG. 3A illustrates a conceptual diagram of a top view of a data storage device in the form of a disk drive showing an Open Loop Boot (OLB) spiral, in accordance with aspects of the present disclosure.
Figure 3B:
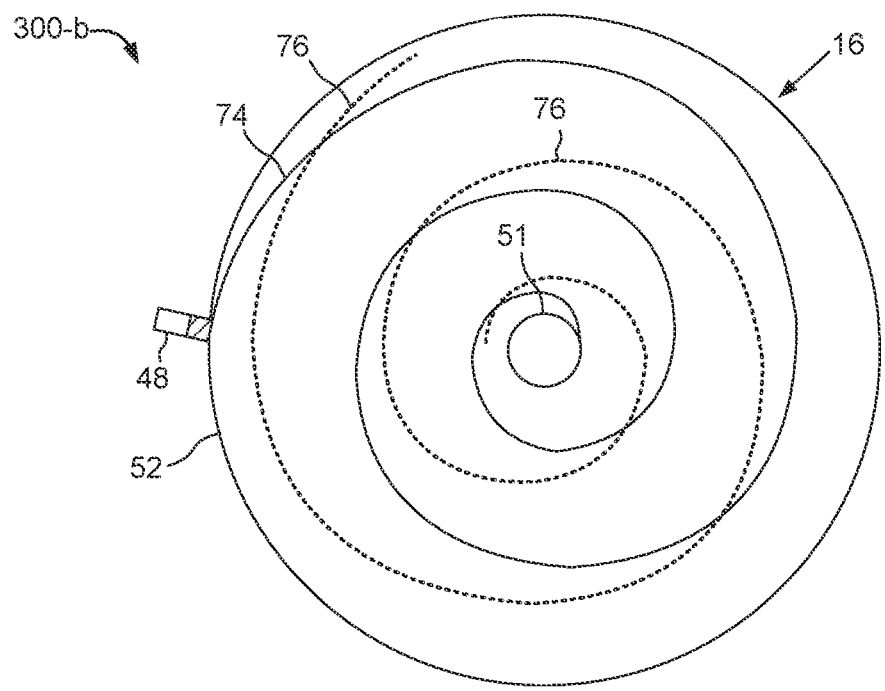
FIG. 3B illustrates a conceptual diagram of a top view of a data storage device in the form of a disk drive showing a spiral servo track, in accordance with aspects of the present disclosure.

FIG. 3A shows an embodiment 300-a wherein after calibrating the feed-forward compensation, the control circuitry 22 executes a seek using the feed-forward compensation to write a bootstrap spiral track 74 from the inner diameter (ID) 51 to the outer diameter (OD) 52 of a disk 16. The bootstrap spiral track 74 may comprise any suitable format, wherein in one embodiment the bootstrap spiral track 74 comprises a high frequency signal interrupted periodically by sync marks. After writing one or more of the bootstrap spiral tracks 74, in some examples, one or more spiral servo tracks 76 may be written to the disk 16 while servoing on the bootstrap spiral track 74, as shown in FIG. 3B. In the embodiment 300-b of FIG. 3B, the spiral servo track 76 is written from the OD 52 to the ID 51 of the disk 16. Further, a servo state for the head 18 (e.g., position) may be updated at each bootstrap spiral track crossing (i.e., crossing of bootstrap spiral tracks 74 and spiral servo tracks 76). That is, in one embodiment the bootstrap spiral track 74 improves the accuracy of writing the spiral servo track 76 by providing feedback to the servo control system while writing the spiral servo track 76. In one embodiment, the feed-forward compensation may also be used to improve the seek performance while writing the spiral servo track 76 in addition to processing the servo information provided by each bootstrap spiral track 74 crossing. In one embodiment, the spiral servo track 76 may be used as a final servo pattern that defines servo tracks used to access the disk 16 during normal access operations, and in another embodiment, the spiral servo track 76 may be processed to write a set of concentric servo sectors (e.g., servo sectors 6, servo sectors 32) in order to define the servo tracks, as previously described in relation to FIGS. 1 and 2. In yet another embodiment, the concentric servo sectors may be written by servoing on the bootstrap spiral tracks 74 (i.e., without writing the spiral servo tracks 76). In one embodiment, the control circuitry 22 may write multiple bootstrap spiral tracks 74 to the disk 16 by seeking using the feed-forward compensation.

Figure 4:
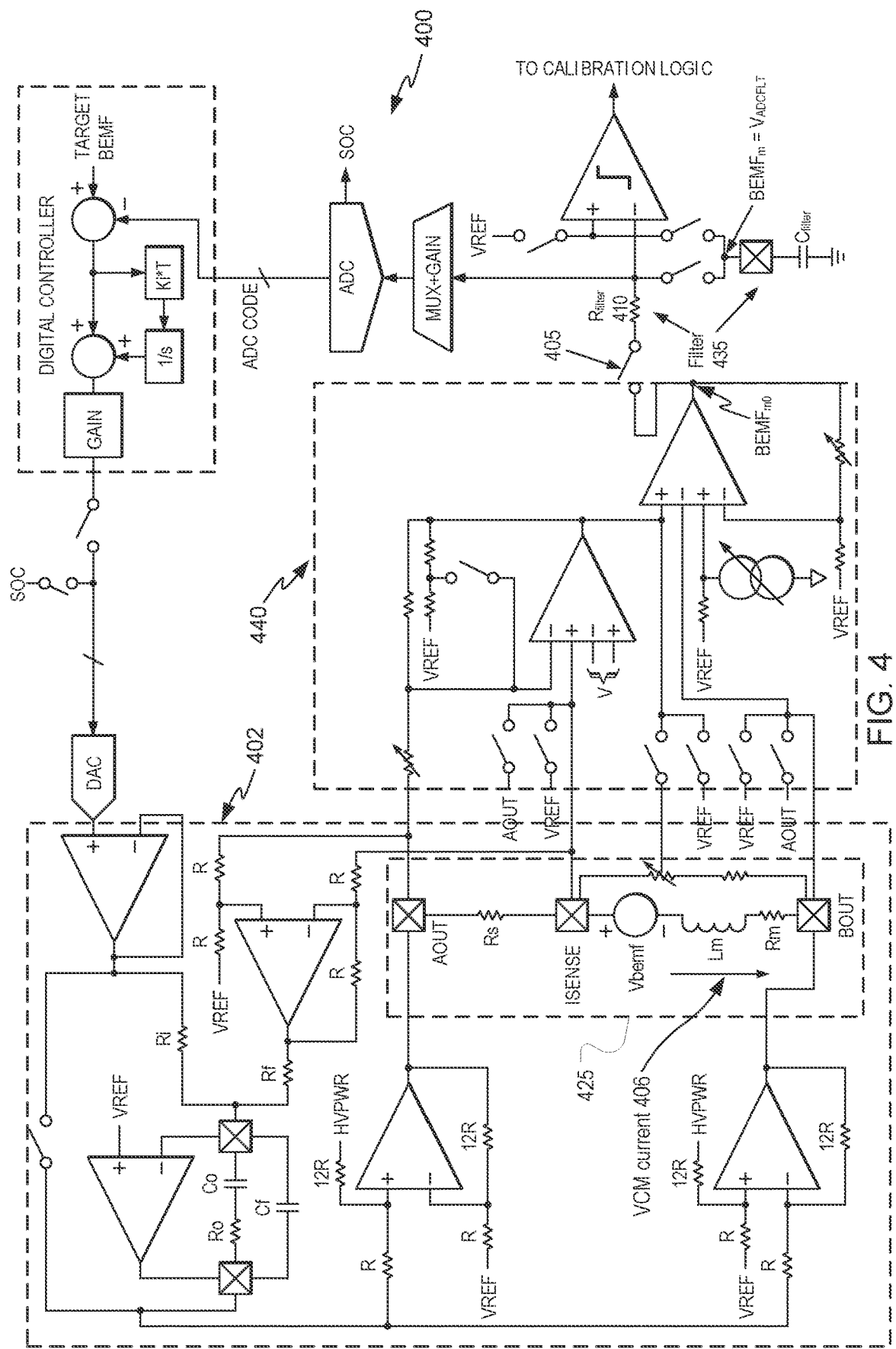
FIG. 4 illustrates a schematic diagram of a Voice Control Motor (VCM) driver circuit and a Back Electromotive Force (BEMF) extraction circuit of a data storage device, such as a disk drive, in accordance with aspects of the present disclosure.

In some embodiments, the BEMF voltage (shown as $V_{bemf}$ within the VCM driver 402 in FIG. 4) representing the velocity of the VCM 20 may be estimated by sampling the ADC filter voltage 501 ($BEMF_m$, or $V_{ADCFLT}$, also shown in FIG. 4) at any suitable sample rate in order to update the feed-forward compensation at any suitable frequency during the seek. As noted above, an inductance ($L_m$ in FIG. 4) of the VCM 20 induces a transient in the initial BEMF measurement, $BEMF_{m0}$ voltage, each time the VCM DAC is updated with the next feed-forward compensation at each sample instance. FIG. 4 illustrates a schematic diagram 400 of a VCM driver circuit 402 and a BEMF extraction circuit 440 of a data storage device, such as a disk drive, in accordance with aspects of the present disclosure. In FIG. 4, circuitry 425 represents an example representation of the VCM, where VCM current 406 corresponds to the current flowing through the windings of the VCM. Further, the output voltage ($BEMF_{m0}$) of the BEMF extraction circuit 440 provides an estimation of the $V_{bemf}$ before the filter 435, while $V_{ADCFLT}$ or $BEMF_m$ provide an estimation of the $V_{bemf}$ after the filter 435.

As noted above, in some cases, a switch 405 coupled to a low pass filter 435, the low pass filter 435 comprising a resistor ($R_{filter}$ 410) and a capacitor ($C_{filter}$), may be opened at the point of VCM DAC update, which allows the transient spike (e.g., $L_m$ di/dt transient spike) to settle. In some cases, the switch 405 is opened by the control circuitry 22. Further, after the transient spike settles (e.g., between 50 to 80 us), the control circuitry 22 closes (or turns on) the switch 405 for regular low pass filtering. In this way, the transient spike from the VCM driver circuit 402 is prevented from entering the low pass filter 435 from the BEMF extraction circuit 440, which serves to reduce noise in the BEMF measurement, i.e., $BEMF_m$. Additionally, or alternatively, by controlling the opening/closing of the switch 405, the low pass filter 435 can more effectively filter out the BEMF sensing noise, as compared to the prior art. In some aspects, controlling the opening/closing of the switch 405 also removes the need to wait for filter setting following the VCM's transient spike. By controlling the opening/closing of the switch 405, the control circuitry 22 switches on BEMF measurement from the VCM for intervals of $BEMF_{m0}$ that are free of transient spikes in the $BEMF_{m0}$. The control circuitry 22 then processes the measured $BEMF_m$ signals from intervals of the initial BEMF measurement, $BEMF_{m0}$, that are free of spikes in a change of current term (e.g., di/dt, L*di/dt) of the $BEMF_{m0}$ equations (2) and (3).

Figure 5A:
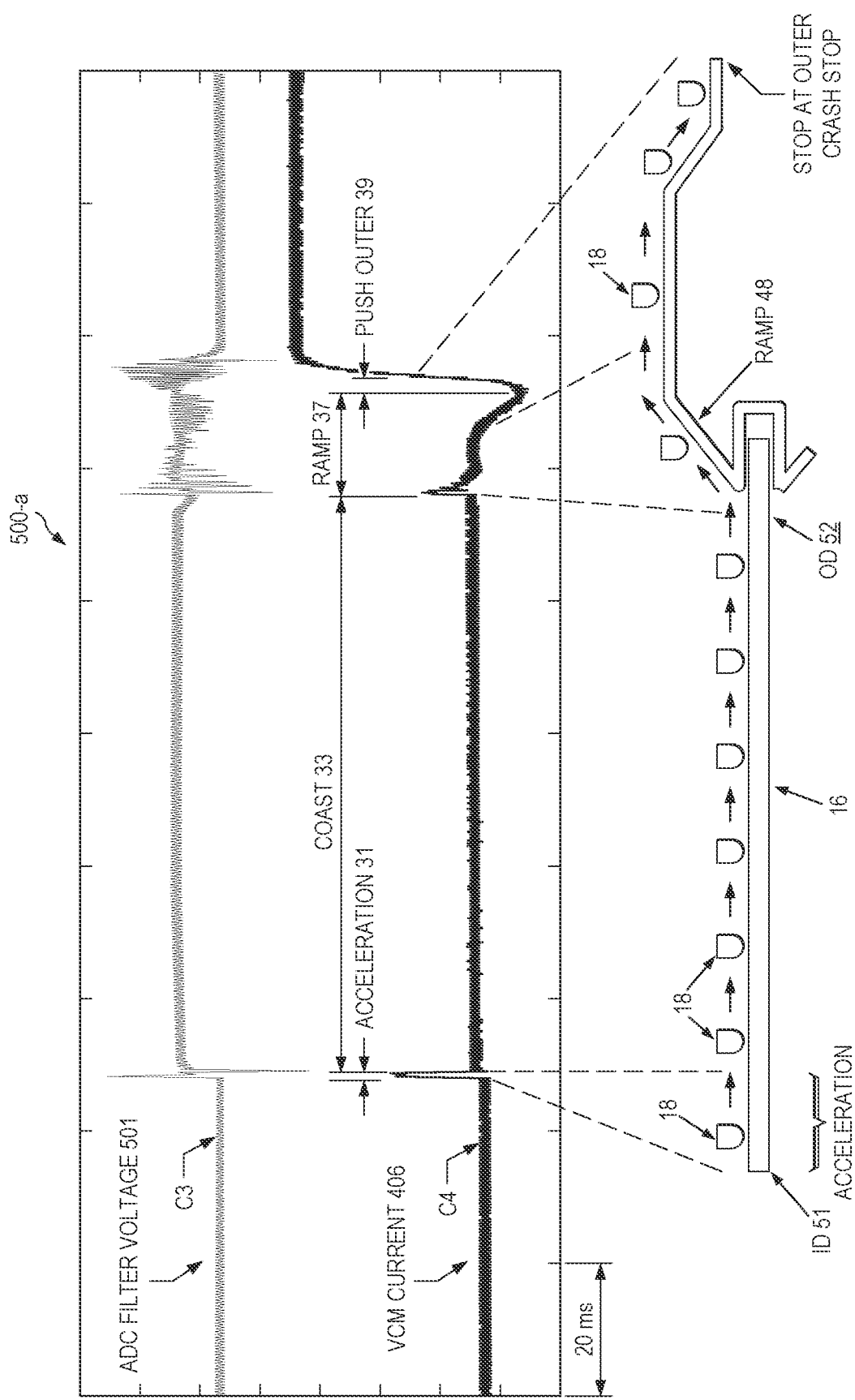
FIG. 5A illustrates a conceptual graph of voltage and current measurements, including transient spikes, during an OLB phase of a data storage device, in accordance with aspects of the present disclosure.

FIG. 5A illustrates a conceptual graph 500-a of voltage and current measurements, including transient spikes, during an OLB phase of a data storage device, in accordance with aspects of the present disclosure. In graph 500-a, waveform C3 depicts the voltage measurements at the ADC filter (e.g., shown as ADC filter 435 in FIG. 4) or the ADC filter voltage ($V_{ADCFLT}$) 501, otherwise also called $BEMF_m$, while waveform C4 depicts the VCM current 406 over time. As previously described in relation to FIG. 3A, the OLB phase may refer to the phase when the control circuitry 22 controls the actuation of the VCM 20 to write a first bootstrap spiral on a blank disk. In some examples, the disk head 18 writes the OLB spiral from the ID 51 of the disk 16 to the OD 52 of the disk, where the writing may be based on the VCM control signals 38 received from the control circuitry 22. Writing the OLB spiral may comprise a plurality of phases, such as, acceleration 31 (e.g., an interval where the disk head 18 is accelerated over the disk surface until it attains a constant velocity), coast 33 (e.g., an interval where the disk head is maintained at the constant velocity), ramp 37 (e.g., an interval where the disk head 18 is loaded onto the ramp 48), and outer push 39 (e.g., an interval where the disk head 18 climbs up the ramp and is parked). During the acceleration phase, the control circuitry 22 controls the actuation of the VCM 20, causing the VCM 20 to accelerate the disk head 18 to a constant velocity over the disk surface 17. In some circumstances, the VCM current 406 (also labeled in FIG. 4) spikes as the disk head is accelerated over the disk surface. In the example shown, the VCM current 406 spikes about 700-800 mA in roughly 0.1 ms. Assuming the intrinsic inductance (shown as $L_m$ in FIG. 4) of the VCM is roughly 1 mH, the corresponding $L_m$ di/dt transient spike can be calculated to be around 8 V when the acceleration current is applied. In such cases, this $L_m$ di/dt term (e.g., ~8V) induced due to the rapid change of VCM current 406 is defined as a transient spike and ignored in the BEMF calculation performed by the control circuitry 22. According to aspects of this disclosure, in some cases, a $L_m$ di/dt term (i.e., non-transient) may be considered while estimating the BEMF, which increases the accuracy of the BEMF estimation. Currently used techniques often ignore the $L_m$ di/dt term, regardless of if it is transient or not, in the BEMF calculation equation. Further, in some circumstances, currently used techniques for BEMF calculation allow this $L_m$ di/dt transient spike to enter the low pass filter and settle there before measuring the BEMF, leading to latency.

Figure 5B:
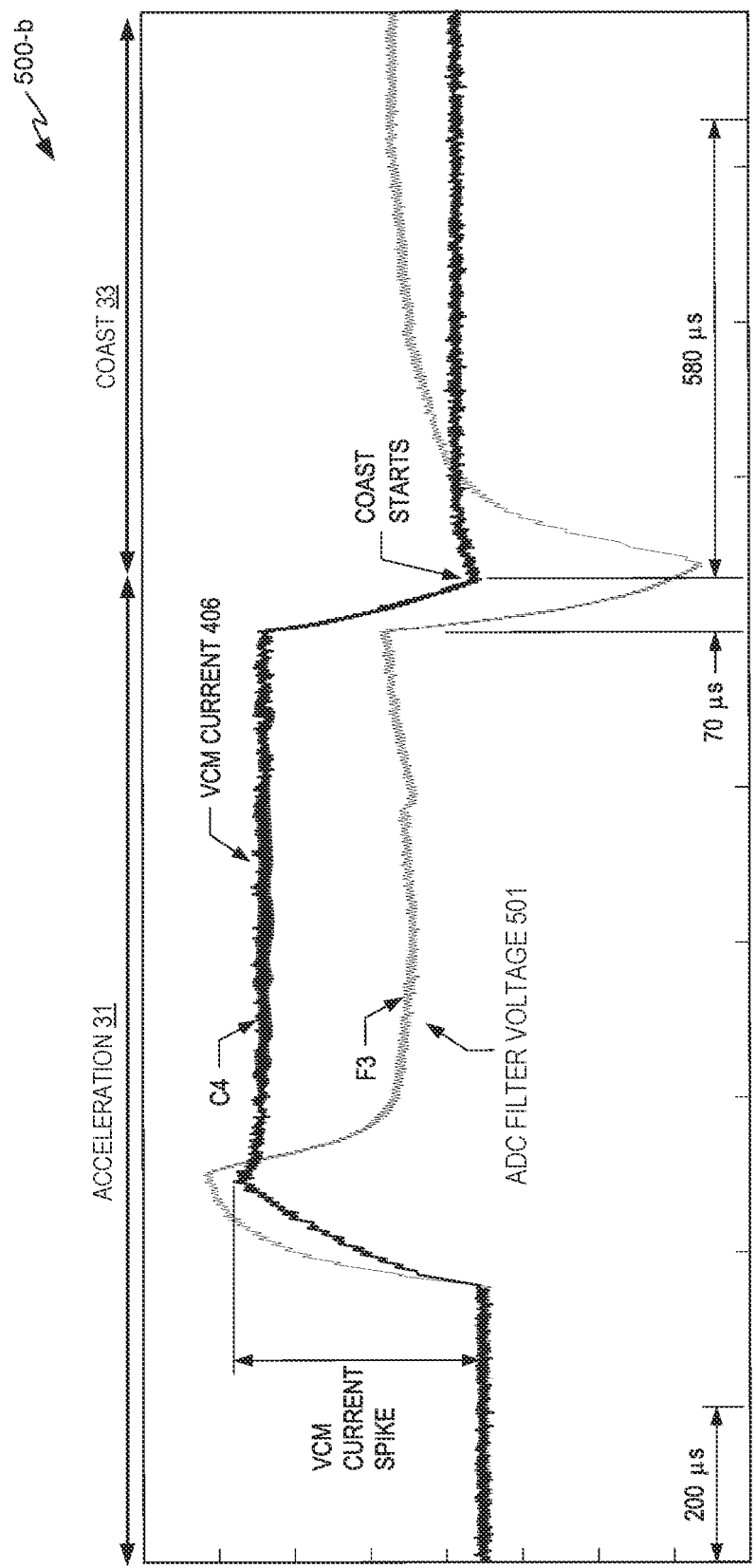
FIG. 5B illustrates a detailed view of the OLB acceleration phase in FIG. 5A, in accordance with aspects of the present disclosure.

FIG. 5B illustrates a conceptual graph 500-b showing a detailed view of the OLB acceleration phase in FIG. 5A, in accordance with aspects of the present disclosure. In graph 500-b, waveform F3 depicts the voltage measurements at the ADC filter (e.g., shown as ADC filter 435 in FIG. 4) or the ADC filter voltage 501, while waveform C4 depicts the VCM current 406 over time. As seen in FIG. 5B, after acceleration 31, the total transient time for the ADC filter is about 650 µs (i.e., 70 µs+580 µs). Currently used techniques for BEMF calculation may set the ADC filter sample delay for the transient spike(s) to settle to about 400 µs, thus removing the majority of the effects of the transient spikes. However, a ~400 µs delay is significant enough to adversely impact the BEMF measurement speed and accuracy. Aspects of the present disclosure relate to optimizing the BEMF measurement speed and accuracy by removing or reducing the need to wait for filter setting following the VCM's transient spike.

FIG. 6A illustrates a schematic diagram 600 of one or more switches (e.g., switch 605) coupled between a VCM driver circuit 610 and a low pass filter 612, in accordance with aspects of the present disclosure. In this example, the VCM driver circuit 610 includes the VCM driver circuit 402 and at least a portion of the BEMF extraction circuit 440, previously described in relation to FIG. 4. Further, low pass filter 612, which may be similar or substantially similar to the filter 435 in FIG. 4, comprises a resistance ($R_{filter}$ 410) and a capacitance ($C_{filter}$). In some examples, a switch 605 is coupled to one end of the $R_{filter}$ 410. Further, the voltage at the output of the filter 612, shown as $V_{ADCFLT}$ 501, which is also the estimated/measured $BEMF_m$, provides an estimation of the true/actual BEMF voltage drop of the VCM and/or the velocity of the VCM. As seen, the initial BEMF measurement ($BEMF_{m0}$) and the measured BEMF ($BEMF_m$) are the indirectly measured BEMF voltages before and after the low pass filter 612, respectively.

Further, FIG. 6B illustrates a conceptual graph 601 of voltage and current measurements, including transient spikes, during an OLB phase of a data storage device, in accordance with aspects of the present disclosure. FIG. 6B depicts an example of voltage (ADC filter voltage 501 or $V_{ADCFLT}$) and current (VCM current 406 or $I_{VCM}$) measurements at the end of a seek operation, as seen in existing techniques. As noted above, existing techniques for BEMF calculation allow the transient spike 63 from the VCM to enter the low pass filter. FIG. 6B depicts this transient spike 63 in the ADC filter voltage waveform (F3). According to aspects of the present disclosure, the control circuitry (e.g., shown as control circuitry 22 in FIG. 2A) opens the switch 605 coupled to the input of the low pass filter 612 for a brief duration (e.g., from about 50 µs to about 80 µs) until the transient spike settles (or substantially settles, for instance, drops below 90% of its peak level, drops below 95% of its peak level, etc.). Opening the switch 605 (e.g., for the interval labeled as disconnect filter 67 in FIG. 6B) may serve to ensure that the transient spike bypasses, or is prevented from entering, the low pass filter 612. After the transient spike settles (typically within 80 µs, could vary in different implementations), the control circuitry 22 resumes low pass filtering by turning on (or closing) the switch 605. By preventing the noisy transient spike(s) from the VCM from entering the low pass filter's input, the control circuitry 22 optimizes the low pass filter's ability to filter out BEMF sensing noise, in accordance with aspects of the disclosure. Additionally, or alternatively, by waiting until the transient spike settles after opening the switch 605, aspects of the present disclosure alleviate the need to wait for the low pass filter settling. For example, by preventing the transient spike from the VCM from entering the low pass filter, there is no transient spike (e.g., transient spike 63) in the low pass filter voltage waveform (F3) that needs to be settled to ensure accurate BEMF estimation. In this way, the present disclosure enables BEMF estimation to be performed much earlier than possible in the prior art (e.g., 50-80 µs as compared to 400 µs in the prior art).

Figure 7A:
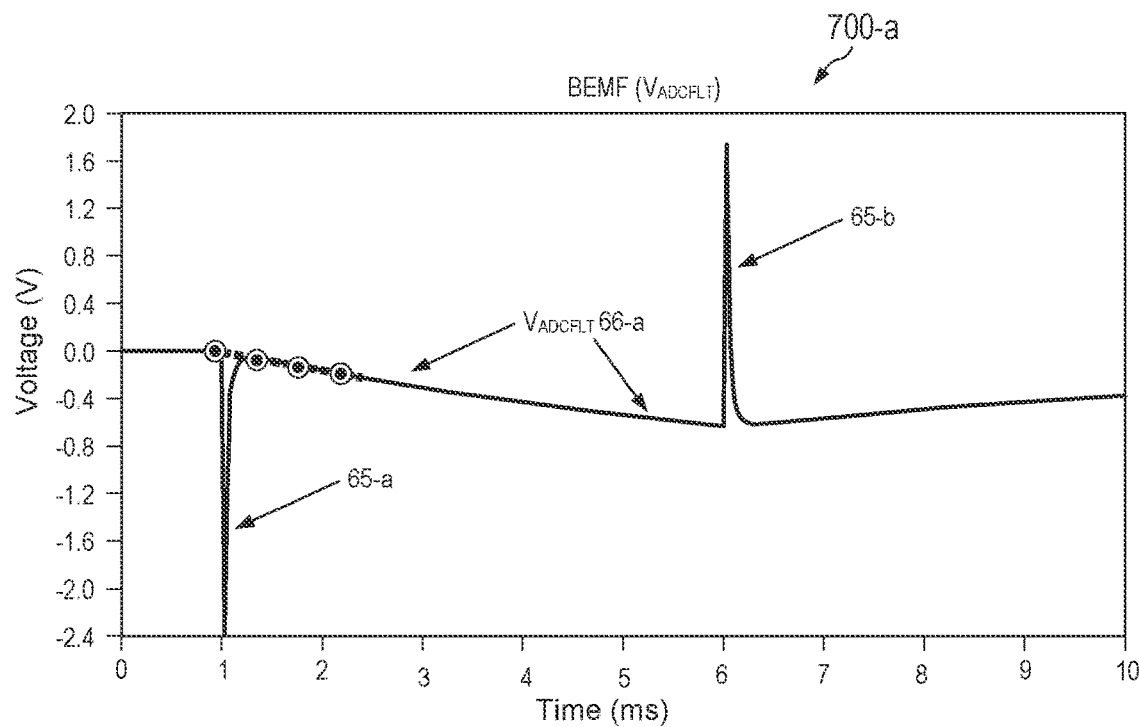
FIGS. 7A and 7B illustrate conceptual graphs of a prior art simulation and a simulation of a transient bypass implementation, respectively, in accordance with aspects of the present disclosure.
Figure 7B:
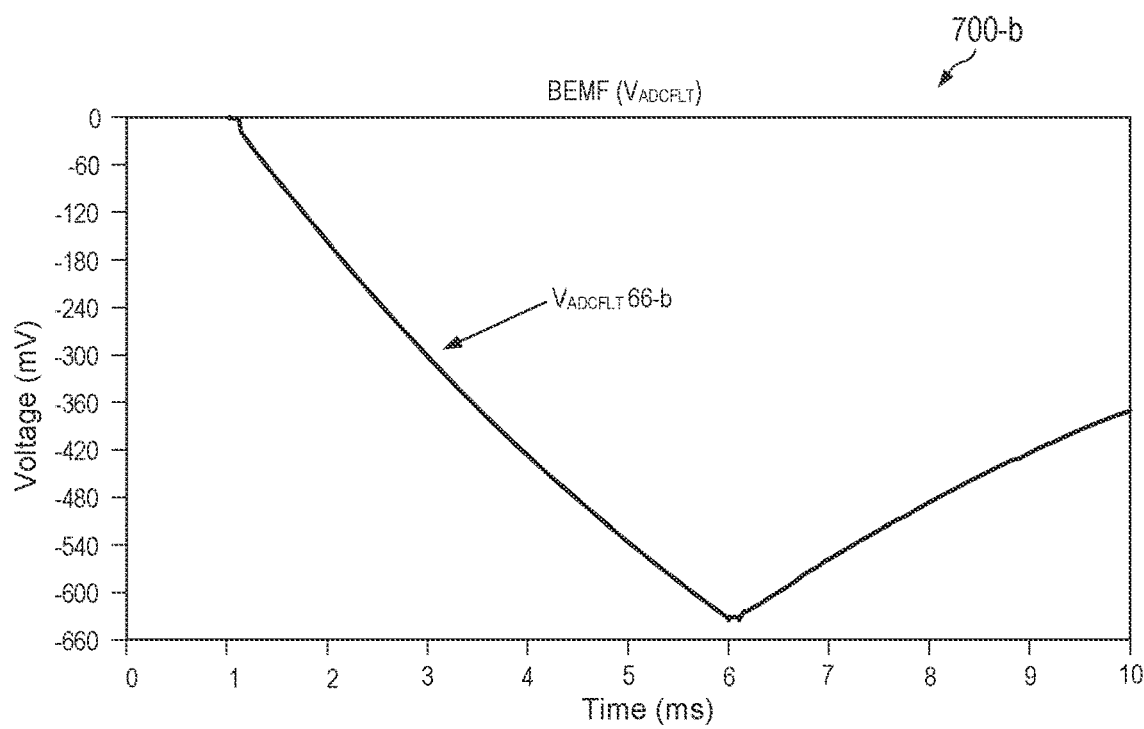

Turning now to FIGS. 7A and 7B, which illustrate conceptual graphs 700 of a prior art simulation and a simulation of a transient bypass implementation, respectively, in accordance with aspects of the present disclosure. Conceptual graph 700-a depicts an example of voltage measurements against time for a low pass filter in the prior art. As noted above, a low pass filter may be coupled to an output of the VCM driver for filtering out the noisy transient spikes (e.g., di/dt or L*di/dt transient spikes), as well as one or more other signals, from the VCM. In the prior art, BEMF extraction and estimation may need to wait until the low pass filter settles (i.e., until the transient spikes that entered the low pass filter settle). In the example shown, the ADC filter voltage ($V_{ADCFLT}$ 66-a) includes a negative spike 65-a (e.g., from around 0 V to about −2.4 V) at 1 ms, followed by a positive spike 65-b (e.g., from around −0.6V to about +1.6 V) at 6 ms.

Conceptual graph 700-b depicts an example of voltage measurements against time for the low pass filter (e.g., $V_{ADCFLT}$ in FIG. 6A), in accordance with aspects of the present disclosure. In this example, a switch coupled to the input of the low pass filter is used to prevent the VCM's transient spikes/noise (e.g., di/dt or L*di/dt transient spikes) from entering the low pass filter. The control circuitry 22 in FIG. 2A may be used to control the opening/closing of the switch at appropriate points in time, for instance, at intervals comprising spikes in the $BEMF_{m0}$ (open) and other intervals that are free of spikes in the $BEMF_{m0}$ (close). In some examples, the control circuitry 22 opens the switch for a user programable duration, such as 50 microseconds, each time the VCM current is updated in the DAC. Besides preventing the transient spikes from entering the low pass filter, this also removes (or minimizes) the delay experienced in the prior art as a result of waiting until the transient spikes/noise are filtered out by the low pass filter.

As seen in FIG. 7B, the ADC filter voltage or $V_{ADCFLT}$ 66-b (i.e., corresponding to the BEMF estimation) is significantly smoother and less "spiky" than in the prior art graph (FIG. 7A). For example, the ADC filter voltage 66-b experiences a gradual dip from around 0 mV to around −660 mV (−0.66V) from about 1 ms to about 6 ms, at which point it gradually climbs up. Further, as compared to the prior art, where two transient spikes at around 1 and 6 ms are included in the BEMF estimation, no such spikes are present in the BEMF estimation graph 700-b provided by the present disclosure. Thus, aspects of the present disclosure facilitate enhancement of BEMF estimation by ensuring that the effects of the transient spikes/noise (i.e., corresponding to the change of current term of the $BEMF_{m0}$) from the VCM are not propagated in the BEMF estimation. In accordance with aspects of the present disclosure, the control circuitry 22 estimates the BEMF from the ADC filter voltage measurements shown in FIG. 7B. In some cases, the ADC filter voltage measurements correspond to the BEMF created across the VCM coil(s).

While not necessary, in some embodiments, the OFF period of the switch (e.g., switch 605 coupled to the low pass filter 612) may be longer than the duration of the VCM transient spike. Alternatively, the OFF period of the switch may be at or around (e.g., slightly longer than, slightly shorter than) the duration of the VCM transient spike. For example, the OFF period of the switch may be at least 90%, at least 95%, at least 110%, at least 120%, etc., of the transient spike duration. In one non-limiting example, the OFF period of the switch (i.e., the duration for which the switch is opened) may be less than 80 µs (e.g., 50 µs, 60 µs, etc.). In one non-limiting example, the control circuitry 22 may calculate an estimate of the BEMF from the $V_{ADCFLT}$ 66-b (e.g., shown in graph 700-b), for example, from the $V_{ADCFLT}$ 66-b from 80 µs to about 400 µs.

Figure 8:
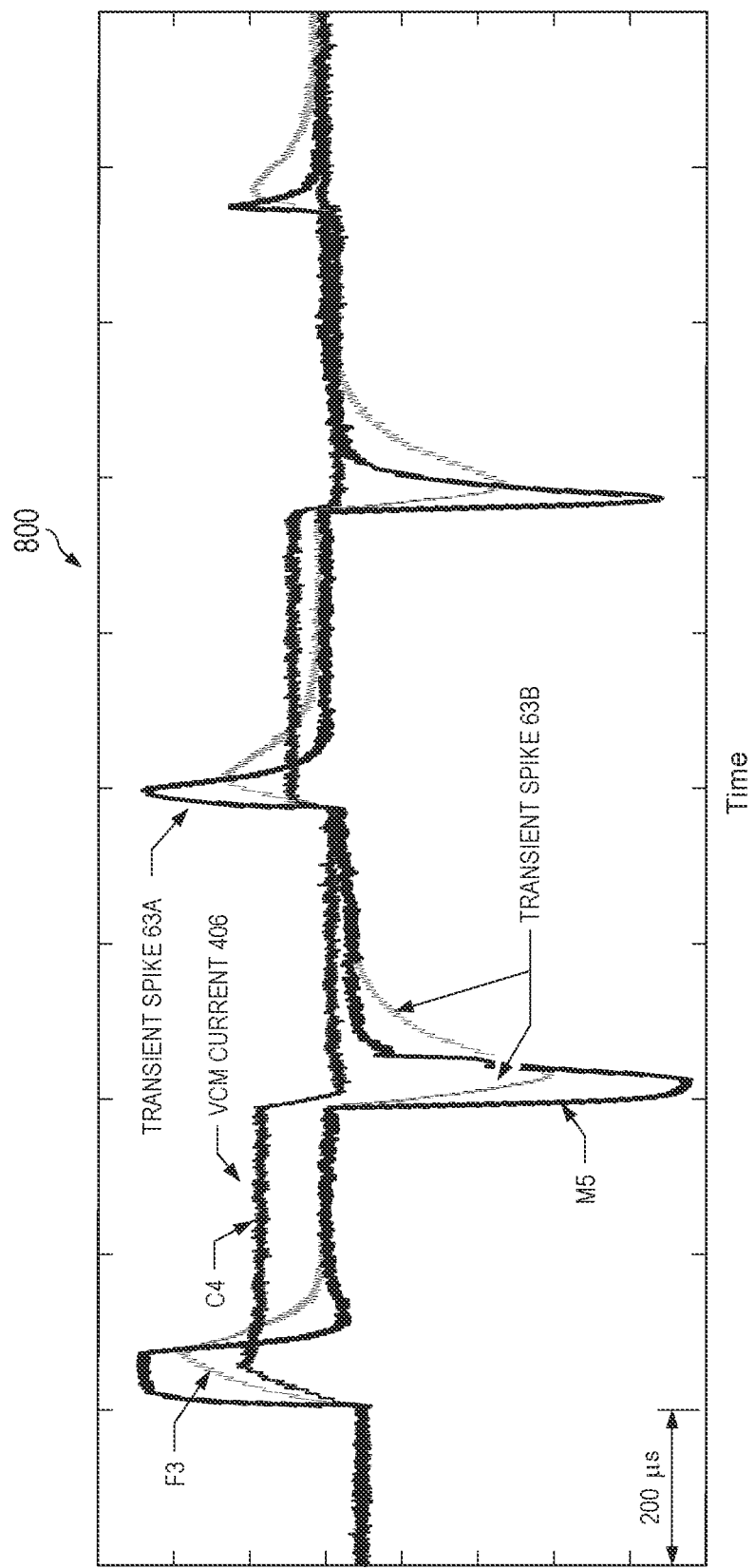
FIG. 8 illustrates a conceptual graph comparing transient spikes for two ADC filters utilizing resistors with different resistance values, in accordance with aspects of the disclosure.

FIG. 8 illustrates a conceptual graph 800 comparing transient spikes 63A and 63B for two Analog to Digital Converter (ADC) filters utilizing resistors with different resistance values, in accordance with aspects of the disclosure. Here, waveform M5 corresponds to the ADC filter voltage when the resistance of the ADC filter, shown as $R_{filter}$ 410 in FIG. 4, is 3 kΩ, while waveform F3 depicts the ADC filter voltage when the resistance ($R_{filter}$ 410 in FIG. 4) of the ADC filter is 24 kΩ. Further, the VCM current 406 (previously described and illustrated in reference to at least FIG. 5B) is depicted by waveform C4.

In accordance with another aspect of the present disclosure, the corner frequency of the low pass filter may be selected such that the transient spikes from the VCM 20 can be bypassed after a VCM DAC update. In some cases, the transient spikes may be bypassed (or ignored) by waiting to perform sampling until a low pass filter "OFF period" begins. Next, the ADC filter waveforms (i.e., without the transients) may be read one or more times and averaged (or digitally filtered using any other means). In this way, the ADC filter sample ignores all (or at least a portion of) the effects associated with the VCM transients (e.g., L*cli/dt or di/dt transient spikes). While not necessary, in some embodiments, this filtering may be performed in firmware (FW). As shown in FIG. 8, a smaller resistance value (e.g., 3 kΩ) may result in a shorter transient 63A, i.e., as compared to the transient 63B induced by a larger resistance (e.g., 24 kΩ), with the trade-off being that the filter is slightly less effective.

Figure 9:
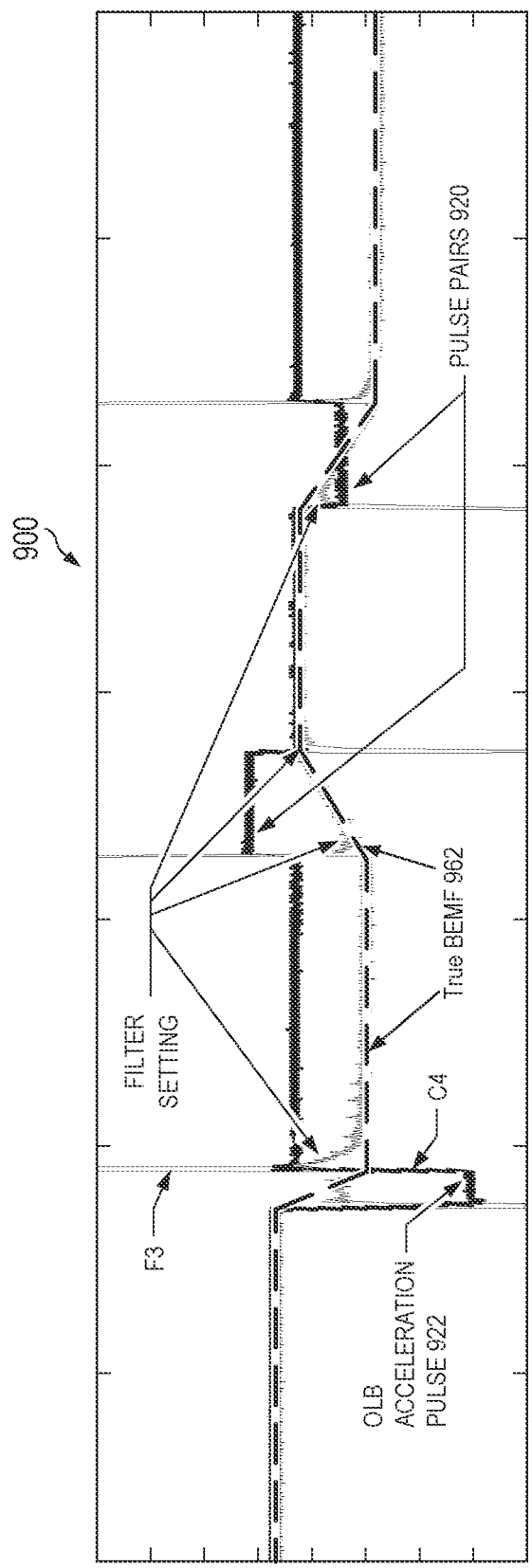
FIG. 9 illustrates a conceptual graph depicting filter settling during an OLB phase of a data storage device, in accordance with aspects of the disclosure.

FIG. 9 illustrates a conceptual graph 900 depicting filter settling during an OLB phase of a data storage device, in accordance with aspects of the disclosure. Graph 900 depicts two waveforms, where, in this example, waveform C4 corresponds to an OLB acceleration pulse 922 having a magnitude of around 800 mA and a duration of about 1 ms. Further, waveform F3 corresponds to the voltage waveform of an ADC filter with a 3 µs time constant implemented using a 3 kΩ resistor and a 1 nF capacitor. Waveform F3 also depicts the filter settling time achieved using the 3 kΩ resistance. In some examples, the pulse pairs 920 (e.g., around 200 mA and spanning 2 ms) may be utilized to characterize the velocity (e.g., VCM velocity) from the $BEMF_m$ with respect to a servo pattern. Additionally, FIG. 9 also includes a waveform representing the true/actual BEMF 962 of the VCM 20 against time, according to various aspects of the disclosure.

Figure 10:
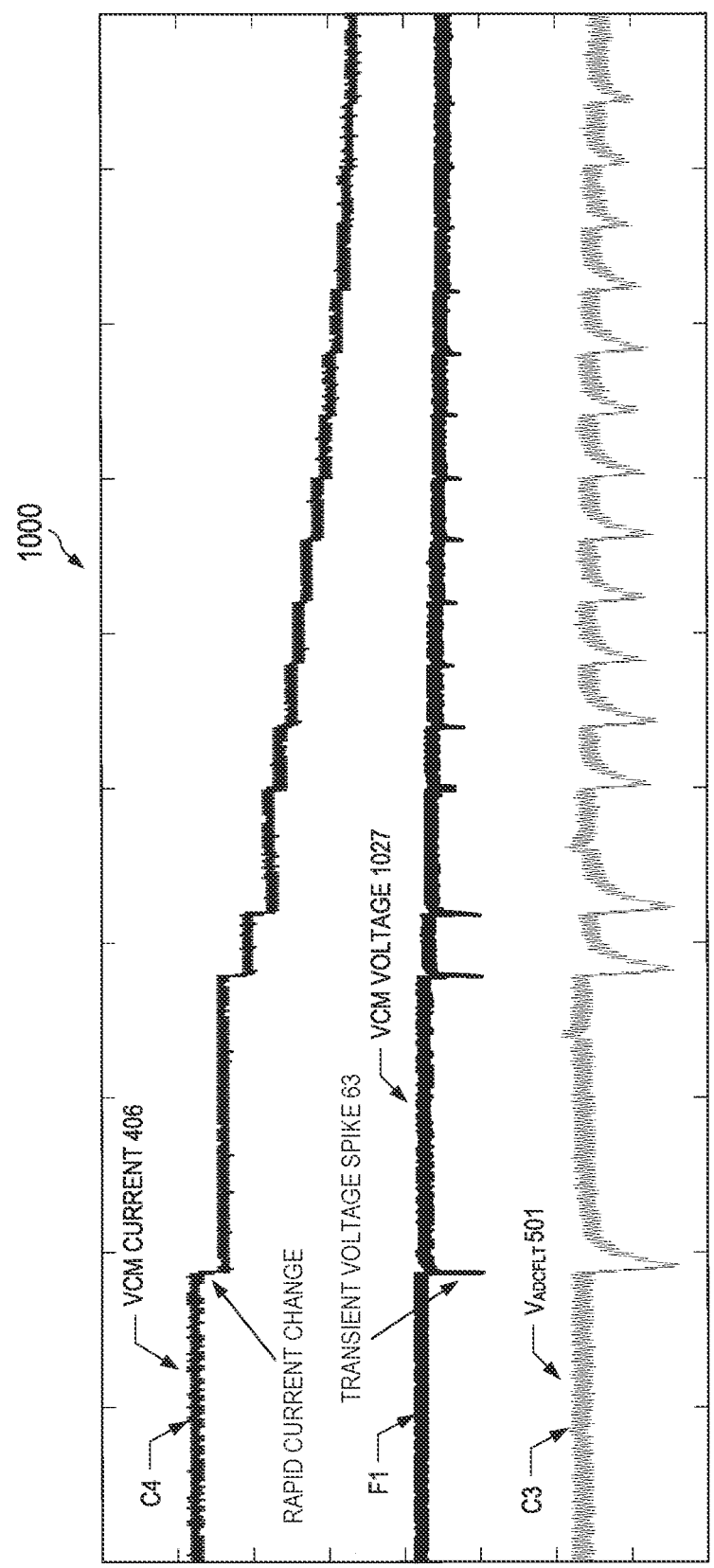
FIG. 10 illustrates a conceptual graph of VCM current, VCM voltage, and ADC filter voltage against time, in accordance with aspects of the disclosure.

FIG. 10 illustrates a conceptual graph 1000 of VCM current 406 (waveform C4), VCM voltage 1027 (waveform F1), and ADC filter voltage 501 (waveform C3) against time, in accordance with aspects of the disclosure. As noted above, the VCM current 406 may experience rapid changes when a disk head is loading/unloading from a ramp, also referred to as load-unload or LUL. In some cases, when a ramp is detected, the DAC input provided to the VCM 20 may increase to compensate for the increased friction. This increased input to the VCM 20 may generate a transient spike 63 in the VCM voltage in order to support fast current change, which in turn generates the spike in the BEMF sensing circuit. In some circumstances, prior art techniques may estimate a non-zero velocity due to the BEMF transient spike, when in fact, the VCM velocity is zero. This issue is more common during LUL operations when there is no servo pattern on the disk surfaces. Thus, some prior art techniques may incorrectly assume that the disk head is climbing up the ramp as a result of the transient spikes taking too long to settle. According to aspects of the disclosure, the control circuitry 22 serves to enhance the accuracy of VCM velocity detection by processing BEMF signals from intervals of the initial BEMF measurement, $BEMF_{m0}$, that are free of transient spikes in a change of current term of BEMF. Alternatively, the VCM current 406 may undergo rapid changes during the acceleration phase, such as while writing an OLB spiral on the disk surface.

It should be noted that the example scenarios listed herein are not intended to be limiting, and other situations not described herein may lend to rapid changes in VCM current 406. For instance, VCM current 406 may be subject to sharp changes in other situations experienced during normal operation of a disk drive. In some examples, rapid changes in the VCM current 406 may cause VCM voltage spikes (e.g., transient voltage spike 63). The VCM voltage spikes 63 may be calculated as a function of the inductance (L) of the VCM and a rate of change of the measured current term (di/dt). For instance, the VCM voltage spikes 63 may be represented by a L*di/dt term in the BEMF equation. As used herein, the term "transient spikes" may refer to the VCM voltage spikes (e.g., L*di/dt transient spikes), or alternatively, the rate of change of current term transient spikes (e.g., di/dt transient spikes). Currently used techniques for BEMF estimation often ignore the VCM voltage spikes (i.e., the L*di/dt term) in the BEMF estimation equation. According to aspects of this disclosure, in some instances, an L*di/dt term (e.g., non-transient) may be considered in estimating the BEMF. Equations (1)-(3) shown below depict the relation between the BEMF, the VCM voltage, and the L*di/dt term.

Figure 11:
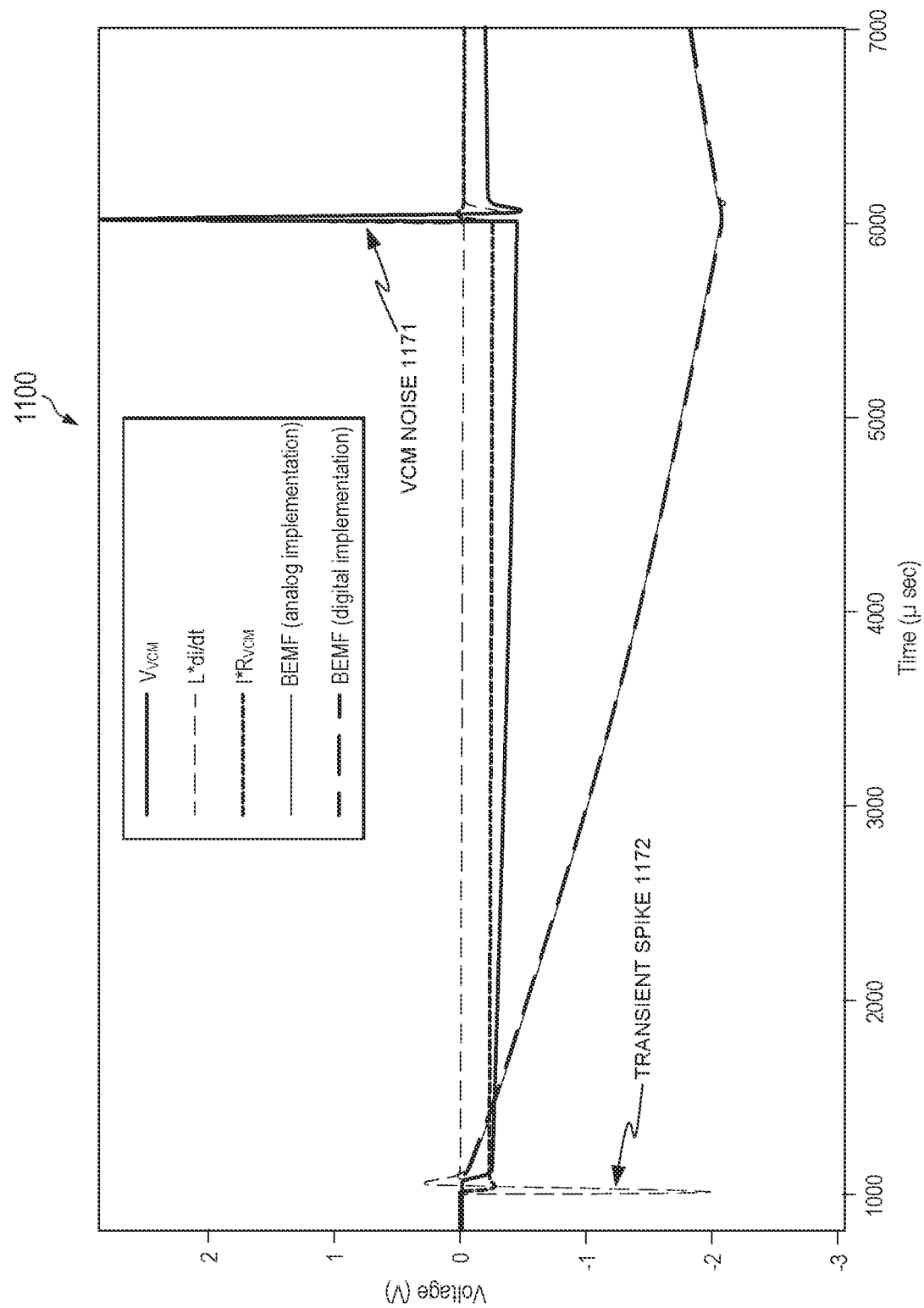
FIG. 11 illustrates a conceptual graph for BEMF estimation using two alternate means, one analog and one digital, both means implemented using a Practical Differentiator (PD), in accordance with aspects of the disclosure.

FIG. 11 illustrates a conceptual graph 1100 for BEMF estimation using two alternate means, one analog and one digital, each implemented using a differentiator, in accordance with aspects of the disclosure. To show how the method works, the true BEMF and its estimation $BEMF_{m0}$ may be represented using one or more of equations (1)-(3) below:

$$BEMF = V_{VCM} - J_{VCM} \times R_m - L_m \frac{dI_{VCM}}{dt} \quad (1)$$

$$BEMF_{m0} = V_{VCM} - (V_{RS} \div R_S) \times R_m - L_m \frac{d(V_{RS} \div R_S)}{dt} \quad (2)$$

$$BEMF_{m0} \approx V_{VCM} - (V_{RS} \div R_S) \times R_m - L_m \frac{\Delta(V_{RS} \div R_S)}{\Delta t} \quad (3)$$

Note here that equation (1) represents the relationship between the voltage applied to the VCM and the corresponding current and BEMF. Equations (2) and (3) show how to derive the raw BEMF measurement before low pass filtering, i.e., $BEMF_{m0}$, from the known motor parameters ($R_m$ and $L_m$), the current sensing resistor ($R_S$), and the measured variables $V_{RS}$ (i.e., $V_{AOUT}$-$V_{ISENSE}$, which represents the voltage across $R_{RS}$) and $V_{VCM}$ (i.e., $V_{ISENSE}$-$V_{BOUT}$, which represents the voltage across the VCM). Because differentiating a quickly changing current is noisy, prior art techniques simply drop the $d(V_{RS} \div R_S)/dt$ term in the analog BEMF estimation; In this disclosure, we retain the differentiator term for the $BEMF_{m0}$, but add the switch 405 to bypass the spiky current change period where the $d(V_{RS} \div R_S)/dt$ cannot be measured well due to being noisy and/or signal saturations. As a result, the $BEMF_m$, which is the low passed filtered version of $BEMF_{m0}$, has a negligible (or substantially lower) spike and latency as compared to the prior art. In some aspects of the present disclosure, the control circuitry 22 may utilize a practical differentiator (PD) when implementing equations (2) or (3) and an optional switch to bypass the transient spikes (e.g., transient spike 1172, VCM noise 1171) when filtering the initial BEMF measurement ($BEMF_{m0}$) to obtain $BEMF_m$. The BEMF estimation may be performed using either analog or digital means. In some cases, the control circuitry 22 samples the voltage across the sensing resistor (e.g., shown as $R_S$ in FIG. 4) and the VCM voltage, for instance, at 200 kHz. Other sampling frequencies are contemplated in different embodiments and the example listed herein is not intended to be limiting. Further, the control circuitry 22 may hold/pause a) processing the BEMF signal, for instance, calculating the $BEMF_m$ from the $BEMF_{m0}$, b) the low pass filter update, or c) both, following a VCM current update at the DAC. The control circuitry 22 may hold/pause the BEMF calculation and the low pass filter for a period that is at least the duration of the transient, which ensures that the di/dt transient noise 1171 in the VCM and/or the L di/dt transients 1172 do not enter the low pass filter.

As seen, FIG. 11 depicts an example of waveforms of the VCM voltage ($V_{VCM}$), L di/dt, and a product of the VCM current and the VCM resistance (labeled as $1*R_{VCM}$). FIG. 11 also depicts the waveform of equations (1) and (3) above. As seen, there is a good match of the BEMF estimation from the digital implementation and the BEMF estimation from the analog implementation.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit, or a VCM power driver circuit, implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry (e.g., control circuitry 22) comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for reducing noise in BEMF sensing for data storage, and other aspects of this disclosure. Persons skilled in the relevant fields of art will be well-equipped by this disclosure with an understanding and an informed reduction to practice of a wide panoply of further applications, architectures, techniques, and methods for reducing noise in BEMF sensing for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a voice coil motor (VCM); and
one or more processing devices, configured to:
actuate the VCM;
switch on measuring a back electromotive force (BEMF) from the VCM for intervals of an initial BEMF measurement that are free of spikes in the initial BEMF measurement, free of spikes being indicative of amplitude measurements not exceeding 5% of a peak amplitude of a preceding interval where a spike has occurred; and
process a measured BEMF signal from the intervals of the initial BEMF measurement that are free of spikes in a change of current term of the initial BEMF measurement.

2. The data storage device of claim 1, wherein the one or more processing devices are further configured to switch off measuring the BEMF from the VCM for an interval that comprises a spike in a change of current term of the initial BEMF measurement.

3. The data storage device of claim 1, wherein the one or more processing devices are further configured to switch on measuring the BEMF from the VCM for intervals of the initial BEMF measurement that are free of spikes in the change of current term of the initial BEMF measurement, and wherein the change of current term of the initial BEMF measurement is based at least in part on a rate of change of current flowing through the VCM.

4. The data storage device of claim 1, wherein the spikes in the initial BEMF measurement comprise a rate of change of current in the initial BEMF measurement exceeding a threshold.

5. The data storage device of claim 1, wherein the one or more processing devices are further configured to control the VCM to accelerate,
 wherein the spikes in the initial BEMF measurement comprise changes in the initial BEMF measurement during intervals when the VCM is accelerated or decelerated.

6. The data storage device of claim 1, further comprising:
 one or more disks; and
 an actuator arm assembly comprising one or more disk heads and the VCM;
 wherein the one or more processing devices are further configured to control the actuator arm assembly to actuate the one or more disk heads over corresponding disk surfaces of the one or more disks.

7. The data storage device of claim 6, wherein the one or more processing devices are configured to control the actuator arm assembly to write at least one bootstrap spiral track from an inner diameter to an outer diameter of at least one of the one or more disks, and wherein the at least one bootstrap spiral track is written open loop and using at least one of the one or more disk heads.

8. The data storage device of claim 6, wherein the one or more processing devices are configured to control the actuator arm assembly to unload at least one of the one or more disk heads on at least one ramp of the data storage device, and wherein the spikes in the initial BEMF measurement comprise changes in the initial BEMF measurement during intervals when the at least one disk head is unloaded on the at least one ramp.

9. The data storage device of claim 6, wherein the one or more processing devices are configured to control the actuator arm assembly to load at least one of the one or more disk heads from at least one ramp of the data storage device to a corresponding disk surface of at least one disk, and wherein the spikes in the initial BEMF measurement comprise changes in the BEMF during intervals when the at least one disk head is loaded on the corresponding disk surface.

10. The data storage device of claim 1, further comprising:
 a filter circuit; and
 a switch coupled to an input of the filter circuit;
 wherein the one or more processing devices are further configured to control the switch to open during intervals of the initial BEMF measurement that comprise spikes in the change of current term of the initial BEMF measurement to prevent the spikes from entering the filter circuit.

11. The data storage device of claim 10, wherein the one or more processing devices are further configured to control the switch to close during intervals of the initial BEMF measurement that are free of spikes in the change of current term of the initial BEMF measurement.

12. A method of operating a data storage device, comprising:
 actuating, by one or more processing devices, a voice coil motor (VCM);
 selectively switching on, by the one or more processing devices, measurement of a back electromotive force (BEMF) from the VCM for intervals of an initial BEMF measurement in the initial BEMF measurement, based on a measurement of spikes, to reduce spikes in a change of current term of the initial BEMF measurement; and
 processing, by the one or more processing devices, a measured BEMF signal from the intervals of the initial BEMF measurement that have less than or equal to a threshold number of spikes in the change of current term of the initial BEMF measurement.

13. The method of claim 12, further comprising:
 switching off, by the one or more processing devices, measuring the BEMF from the VCM for an interval that comprises a spike in a change of current term of the initial BEMF measurement.

14. The method of claim 12, further comprising:
 switching on, by the one or more processing devices, measuring the BEMF from the VCM for intervals of the initial BEMF measurement that are free of spikes in the change of current term of the initial BEMF measurement,
 and wherein the change of current term of the initial BEMF measurement is based at least in part on a rate of change of current flowing through the VCM.

15. The method of claim 12, wherein the spikes in the initial BEMF measurement comprise a rate of change of current in the initial BEMF measurement exceeding a threshold.

16. The method of claim 12, further comprising:
 controlling, by the one or more processing devices, acceleration of the VCM,
 and wherein the spikes in the initial BEMF measurement comprise changes in the initial BEMF measurement during intervals when the VCM is accelerated or decelerated.

17. The method of claim 12, further comprising:
 controlling, by the one or more processing devices, an actuator arm assembly to actuate one or more disk heads over corresponding disk surfaces of one or more disks;
 writing, by at least one of the one or more disk heads, at least one bootstrap spiral track, wherein the at least one bootstrap spiral track is written open loop;
 controlling, by the one or more processing devices, the actuator arm assembly to unload the at least one disk head on at least one ramp;
 and wherein the spikes in the initial BEMF measurement comprise changes in the initial BEMF measurement during intervals when the at least one bootstrap spiral track is written, the at least one disk is loaded or unloaded, or a combination thereof.

18. The method of claim 12, further comprising:
 opening, by the one or more processing devices, a switch coupled to an input of a filter circuit during intervals of the initial BEMF measurement that comprise spikes in the change of current term of the initial BEMF measurement to prevent the spikes from entering the filter circuit; and closing, by the one or more processing devices, the switch during intervals of the initial BEMF measurement that are free of spikes in the change of current term of the initial BEMF measurement.

19. One or more processing devices comprising:
means for actuating a voice coil motor (VCM);
means for switching on measuring a back electromotive force (BEMF) from the VCM for intervals of an initial BEMF measurement that are free of spikes in a change of current term of the initial BEMF measurement; and
means for processing a measured BEMF signal from the intervals of the initial BEMF measurement that are free of spikes in the change of current term of the initial BEMF measurement.

20. The one or more processing devices of claim 19, further comprising means for switching off measuring the BEMF from the VCM for an interval that comprises a spike in a change of current term of the initial BEMF measurement.

21. The one or more processing devices of claim 20, wherein the means for switching off is configured to switch off measuring the BEMF for a period of time at a digital-to-analog conversion (DAC) update of the one or more processing devices.

22. The one or more processing devices of claim 19, further comprising a BEMF extraction circuit and a low pass filter, wherein:
an output of the low pass filter is provided to the means for processing; and
the means for switching on comprises one or more switches coupled to (1) an output of the BEMF extraction circuit, and (2) an input of the low pass filter.

23. A data storage device comprising the one or more processing devices of claim 19.

* * * * *